Feb. 18, 1941.    F. C. BRANDT    2,232,587
STREETCAR HEATING SYSTEM
Filed Sept. 26, 1938

Inventor
Frederick C. Brandt
By George H Fisher
Attorney

Patented Feb. 18, 1941

2,232,587

UNITED STATES PATENT OFFICE 2,232,587

STREETCAR HEATING SYSTEM

Frederick C. Brandt, Chicago, Ill., assignor to Minneapolis-Honeywell Regulator Company, Minneapolis, Minn., a corporation of Delaware Application September 26, 1938, Serial No. 231,705

4 Claims. (Cl. 237—5)

This invention relates in general to air conditioning, and is more particularly concerned with heating and ventilating arrangements for vehicles such as streetcars. In heating of streetcars, it has become common to utilize heated air which is heated by passing it over a group of resistors which act as starting resistance for the car motors when the car is being started, and which act as a load for the car motors for forming a regenerative braking system for decelerating the car. This arrangement provides for utilizing energy which would otherwise be wasted for heating the car. However, this arrangement requires that air be passed over the resistors at all times in order to avoid burning out the resistors. In order to control the temperature in the car, it has heretofore been usual practice to utilize a thermostatically controlled diverting damper which varies the proportions of the heated air supplied to the car and discharged to atmosphere. While systems of this type function satisfactorily during cold weather when heat is constantly required, they do not provide for maintaining proper temperature conditions in the car during mild weather. During mild weather such as when outdoor temperature is at 45° F. or above, it often becomes necessary to supply cool air to the car instead of heated air, due to the heating effect of the sun and due to the heat given off by the occupants.

It is an object of this invention to provide a heating system of this general type for heating street cars or other vehicles which not only automatically controls the supply of heat to the car, but also supplies just the proper amount of cool outside air to the car when cooling is required.

More specifically, it is an object of this invention to provide a system of this type which provides for introducing the cooling air to the space in a manner to avoid chilling the occupants of the car.

Another object of this invention is the provision of a heating and cooling system which supplies heated air near the floor line of the space being heated for thereby maintaining the floor and the occupants' feet warm. while supplying cool air above the floor line, the proportions of heated and cool air supplied being automatically varied in a manner to maintain the desired temperature within the space.

Other objects will appear from the following description and the appended claims.

Figure 2:
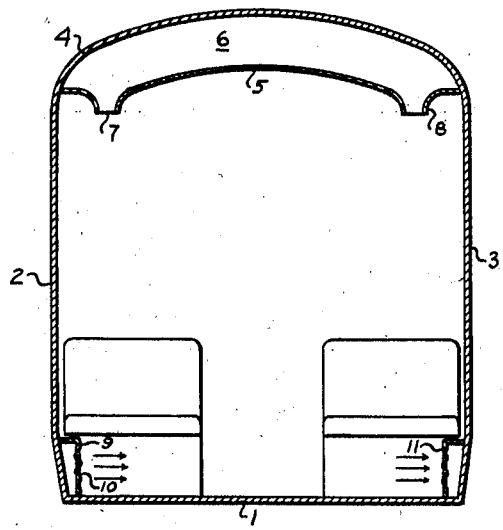
Figure 1:
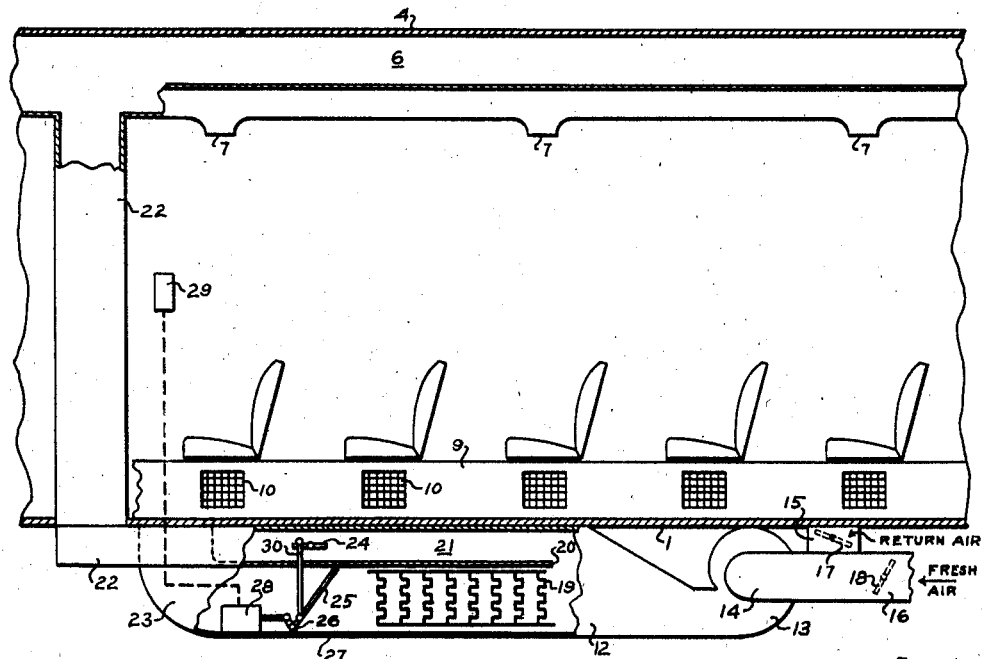

For a full disclosure of this invention, reference is made to the following detailed description and to the accompanying drawing in which:

Figure 1 is a fragmentary sectional view of a street car having my invention applied thereto, and in which Figure 2 is a sectional view taken at right angles to Figure 1.

Referring to the drawing, reference character 1 indicates the floor of a streetcar having side walls 2 and 3 and a roof 4. Located beneath the roof 4 is a ceiling 5 which is spaced from the roof to provide an air passage 6, this air passage communicating with the passenger space through grills 7 and 8.

Extending along the length of the car adjacent the side wall 2 and beneath the seats is a discharge duct 9 which is provided with grills 10 through which heated air is discharged into the passenger space. A similar return duct 11 is provided adjacent the side wall 3. Located beneath the floor 1 is a conditioning chamber 12, the righthand end of which is connected to the discharge of a fan 13. The inlet of fan 13 is connected to an inlet duct 14 which in turn is connected by a duct 15 leading from the return air duct 11 and to a fresh air inlet 16. The proportions of fresh and return air supplied to the conditioning chamber 12 are controlled by means of dampers 17 and 18.

Located within the conditioning chamber 12 is a group of resistance heaters 19 which are connected into the driving motor control circuit, these resistance heaters acting as starting resistances for the car motors, and also as a load for the motors which act as generators when the car is being decelerated. Also located within conditioning chamber 12 is a partition 20 which provides a by-pass 21 for the air around the heating elements 19. This by-pass 21 is connected by a duct 22 to the space 6 between the roof 4 and the ceiling 5. The passage containing the heating elements 19 is connected by a duct 23 to the discharge duct 9.

The flow of air through the duct 22 to the ceiling grills is controlled by means of a damper 24 located within the by-pass 21. The flow of heated air to the discharge duct 9 is controlled by means of a damper 25 located on the downstream side of the heating elements 19. This damper 25 is pivoted at 26 adjacent an opening 27 in the wall of the conditioning chamber 12. It will be apparent that when damper 25 is in the position shown, no heated air will be supplied to the discharge duct 9 and this heated air will pass through the opening 27 to atmosphere. This provides for cooling the resistance elements 19, thus preventing such elements from burning out when no heat is required within the space. As damper 25 is rotated in a clockwise direction, it will decrease the portion of the air passing through opening 27 and increase the portion of air supplied to the discharge duct 9. This damper 25 is actuated by means of a motor 28 under the control of a thermostat 29 located within the car. The motor 28 and thermostat 29 may be of any suitable type and are preferably of the pneumatic type receiving air from the car compressed air braking system. The damper 25 is also connected by means of a cross-connection 30 to the by-pass damper 24. This arrangement causes the by-pass damper 24 to open as the damper 25 rotates in a counter-clockwise direction.

With the parts in the positions shown, the temperature within the car is above the control point of thermostat 29 which has caused this thermostat to position the damper 25 in a manner to stop flow of heated air to the discharge duct 9. This has caused the by-pass damper 30 to be wide open. A mixture of the fresh and return air is now being supplied to the conditioning chamber 12 by the fan 14 and a portion of this air is being passed over the heating elements 19 and through opening 27 to atmosphere for preventing these elements from burning out. Due to the by-pass damper 24 being wide open, air is also passing through the by-pass 21 and duct 22 to the space 6 from which it flows through the grills 7 and 8 into the passenger space. This discharging of cool air into the passenger space at the ceiling will cause cooling of the car while at the same time avoiding discomfort to the passengers.

As the temperature within the car decreases, the thermostat 29 will shift the dampers 24 and 25 in a manner to decrease the flow of cold air through the grills 7 and 8 and to permit flow of heated air into the space through the grills 10. When the space temperature falls below the control point of thermostat 29, the damper 24 will be closed for preventing any unheated air from passing to the space and the damper 25 will be positioned for passing all of the air leaving the heating element 19 to the car.

From the foregoing description, it will be apparent that during all times fresh air for ventilation purposes will be supplied to the car, this air being heated and supplied to the interior of the car at the floor line for heating the car when heat is required. When cooling is required, the supply of heated air adjacent the floor line is discontinued and instead unheated air is supplied at the ceiling for thereby cooling the passenger space. For intermediate values of temperature, the proportions of heated and cooled air supplied to the space will be varied by the thermostat 29 in a manner tending to maintain the temperature constant. This feature is quite important in the heating of street cars, for the supplying of warm air at the floor line provides for maintaining the car floor and the passengers' feet warm. Due to the simultaneous supplying of cool air at the ceiling, considerable warm air may be supplied at the floor line without overheating the car. My improved system therefore permits the supplying of warm air to the car for maintaining the passengers' feet and legs comfortable at times when no heat is necessary for maintaining the desired temperature, overheating of the car being avoided by supplying the proper amount of cooling air at the ceiling. Also my improved system provides for actually cooling the car when cooling is required by automatically reducing or interrupting the flow of heated air, and increasing the supply of unheated air.

While my invention is of special utility for heating street cars, it will be apparent that it is not limited to this specific applicaton and may be used on other types of vehicles and even in stationary applications. Also, while I have shown the dampers 24 and 25 as being actuated in unison by a single motor, these dampers may be provided with separate motors and in some cases may be actuated in sequence so that the supply of heated air is entirely stopped before cool air is introduced to the space being conditioned. The principles of this invention are also applicable to other than heating systems and may be used in cooling systems as well. As many modifications which are within the scope of my invention will occur to those skilled in the art, I desire to be limited only by the scope of the appended claims.

I claim as my invention:

1. In an air conditioning system for a space, in combination, a conditioning chamber including a heating means for heating air passing therethrough, a fan connected to the inlet of said conditioning chamber for forcing air through said chamber, lower duct means for conveying air from said heating means to said space and for discharging said air into said space at a relatively low level, an outlet for heated air from said conditioning chamber, damper means associated with said lower duct means and said outlet in a manner to vary the proportions of heated air passed through said lower duct means and through said outlet, a by-pass for air around said heating means, upper duct means for conveying substantially only air from said by-pass to said space and for discharging said air into said space at a higher level, damper means for controlling the flow of by-passed air to said space, and thermostatic means responsive to the demand for heat for controlling both of said damper means, said thermostatic means acting upon rise in space temperature to decrease the flow of air through said lower duct means and to increase the flow of air through said upper duct means.

2. In an air conditioning system for a space, said space having a lower portion for human occupancy and an upper portion above said lower portion, a mixing chamber, means including fan means for causing return air from said space and fresh air to flow into said mixing chamber, a lower duct means for discharging air into the lower portion of said space, upper duct means for discharging air into the upper portion of said space, a heater, means for passing a portion of the mixture of fresh and return air into contact with said heater and to said lower duct means, means for passing another portion of said mixture to said upper duct means without contacting said heater, first control means for controlling the flow of air through said upper duct means, second control means for controlling the effect of said heater upon said space, and thermostatic means for controlling said first and second control means, said thermostatic means acting upon rise in temperature to reduce the effect of said heater and to increase graduatingly the flow of air through said upper duct means.

3. In an air conditioning system for a space, said space having a lower portion for human occupancy and an upper portion above said lower portion, a mixing chamber, means including fan means for causing return air from said space and fresh air to flow into said mixing chamber, a lower duct means for discharging air into the lower portion of said space, upper duct means for discharging air into the upper portion of said space, a heater, means for passing a portion of the mixture of fresh and return air into contact with said heater and to said lower duct means, means for passing another portion of said mixture to said upper duct means without contacting said heater, first control means for controlling the flow of air through said upper duct means, second control means for controlling the flow of heated air through said lower duct means, an outlet for heated air from said chamber, said outlet being associated with said lower duct means and said second control means so that the proportions of heated air passed through said lower duct means and said outlet will be controlled by said second control means, and thermostatic means for controlling said first and second control means, said thermostatic means acting upon rise in temperature to reduce graduatingly the flow of heated air into said lower duct means and to increase graduatingly the flow of air through said upper duct means.

4. In an air conditioning system for a space, said space having a lower portion for human occupancy and an upper portion above said lower portion, a mixing chamber, means including fan means for causing return air from said space and fresh air to flow into said mixing chamber, a lower duct means for discharging air into the lower portion of said space, upper duct means for discharging air into the upper portion of said space, a heater means for passing a portion of the mixture of fresh and return air into contact with said heater and to said lower duct means, means for passing another portion of said mixture to said upper duct means without contacting said heater, control means for controlling the flow of air through said upper duct means and the effect of said heater upon said space, and thermostatic means for controlling said control means, said thermostatic means acting upon rise in temperature to reduce the effect of said heater and to increase graduatingly the flow of air through said upper duct means.

FREDERICK C. BRANDT.